United States Patent [19]

Sagawa

[11] Patent Number: 5,796,782
[45] Date of Patent: Aug. 18, 1998

[54] DIGITAL MODULATOR WITH ROOT-NYQUIST FILTER

[75] Inventor: Yuichirou Sagawa, Tokyo, Japan

[73] Assignee: NEC Corporation, Tokyo, Japan

[21] Appl. No.: 722,492

[22] Filed: Sep. 27, 1996

[30] Foreign Application Priority Data

Sep. 29, 1995 [JP] Japan ................... 7-252140

[51] Int. Cl.$^6$ ........................................ H04K 1/02
[52] U.S. Cl. ................ 375/296; 332/123; 332/124; 364/724.13; 364/724.16
[58] Field of Search ................ 375/296; 332/123, 332/124; 364/724.13, 724.16

[56] References Cited

U.S. PATENT DOCUMENTS

| | | | |
|---|---|---|---|
| 5,379,322 | 1/1995 | Kosaka et al. | 375/296 |
| 5,404,378 | 4/1995 | Kimura | 375/296 |
| 5,487,089 | 1/1996 | Misaizu et al. | 375/296 |
| 5,657,353 | 8/1997 | Hatcher et al. | 375/296 |

*Primary Examiner*—Stephen Chin
*Assistant Examiner*—Frederick Yu
*Attorney, Agent, or Firm*—Sughrue, Mion, Zinn, Macpeak & Seas, PLLC

[57] ABSTRACT

A digital modulator having a pulse shaping filter which generates and accumulates impulse responses including prior impulse responses and posterior impulse responses to perform a Root-Nyquist raised cosine filtering. The pulse shaping filter includes a dummy accumulation data memory storing dummy accumulation values of prior impulse responses required for initial data transmission. When several initial impulse responses are to be transmitted, for example, on power-up, the impulse responses corresponding to input digital data are generated and added to the dummy accumulation values of prior impulse responses. After the initial transmission, the impulse responses corresponding to input digital data are generated and transmitted without the help of the dummy accumulation values.

18 Claims, 11 Drawing Sheets

| PARALLEL DATA Xk | PARALLEL DATA Yk | PHASE TRANSITION Δφ |
|---|---|---|
| 1 | 1 | $-3\pi/4$ |
| 0 | 1 | $3\pi/4$ |
| 0 | 0 | $\pi/4$ |
| 1 | 0 | $-\pi/4$ |

FIG.9
DUMMY ACCM ROM 111

| TARGET SIGNAL POINT | 4 TRANSITIONS | ACCUMULATED IRs DACCM (4) | 3 TRANSITIONS | DACCM (3) | 2 TRANSITIONS | DACCM (2) | 1 TRANSITION | DACCM (1) |
|---|---|---|---|---|---|---|---|---|
| a | e→f→g→h→a | DACCMa (4) | f→g→h→a | DACCMa (3) | g→h→a | DACCMa (2) | h→a | DACCMa (1) |
| b | f→g→h→a→b | DACCMb (4) | g→h→a→b | DACCMb (3) | h→a→b | DACCMb (2) | a→b | DACCMb (1) |
| c | g→h→a→b→c | DACCMc (4) | h→a→b→c | DACCMc (3) | a→b→c | DACCMc (2) | b→c | DACCMc (1) |
| . . . | | | . . . | | . . . | | . . . | |
| h | d→e→f→g→h | DACCMh (4) | e→f→g→h | DACCMh (3) | f→g→h | DACCMh (2) | g→h | DACCMh (1) |

DIGITAL MODULATOR WITH ROOT-NYQUIST FILTER

BACKGROUND OF THE INVENTION

1. Field of the Invention

The present invention generally relates to digital modulators, and in particular to a digital modulator having a pulse shaping filter.

2. Description of the Related Art

A π/4-shift QPSK (quadrature phase shift keying) modulation scheme has been used to provide improved the bandwidth efficiency and the simplified circuit configuration of a mobile terminal in digital mobile communication systems and digital cordless telephone systems. In the π/4-shift QPSK modulation scheme, as well known, digital data to be transmitted is converted to phase-mapping signals of I channel and Q channel on the I-Q orthogonal coordinate. The I-channel or Q-channel phase mapping signals are pulse-shaped by a Root-Nyquist raised cosine filter (hereinafter referred to as Root-cosine filter) to reduce intersymbol interference.

In general, the Root-cosine filter converts a phase mapping signal into an impulse response which is added to a predetermined number of prior impulse responses and posterior impulse responses to produce transmitted data. When the power has been turned on, however, there are no impulse responses prior to that impulse response. Therefore, it is necessary to generate prior impulse responses. According to conventional digital modulators, the prior impulse responses are obtained by generating extra phase mapping signals.

Figure 1:
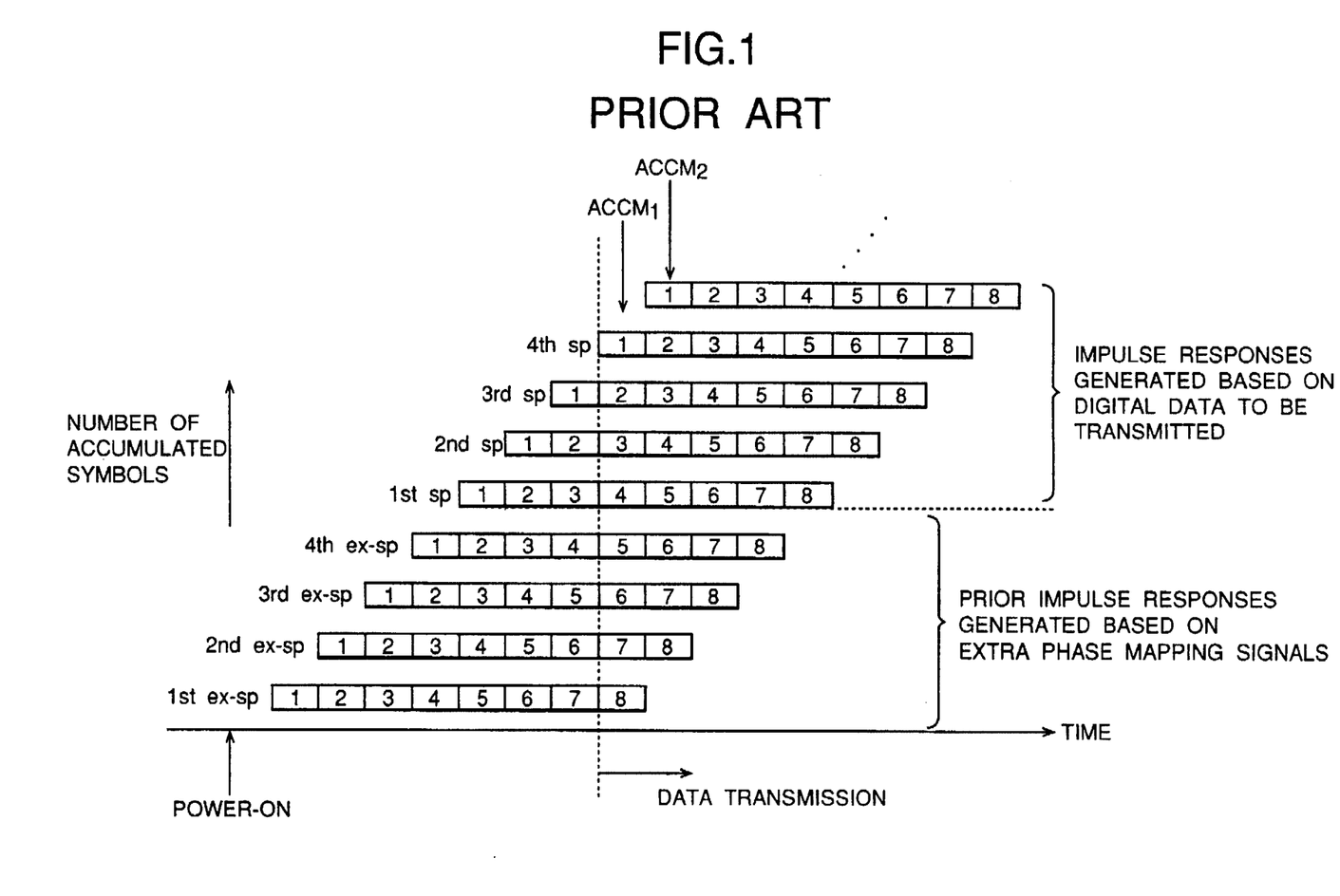
FIG. 1 is a time chart showing a Root-Nyquist raised-cosine filtering operation on power-up in a conventional digital modulator.

As shown in FIG. 1, when the power is turned on, four prior impulse responses are sequentially generated based on four extra phase mapping signals, respectively. When four prior impulse responses and three posterior impulse responses are generated, 8 impulse responses are accumulated to produce transmitted data which is converted into an analog intermediate frequency modulation signal which is up-converted and then transmitted.

However, in the conventional digital modulator, it is necessary to generate I-channel or Q-channel extra phase mapping signals to produce prior impulse responses, resulting in a long time required for the transmission of digital data. According to the conventional system shown in FIG. 1, the data transmission is performed after the time period of several symbols has passed since the power is turned on. Furthermore, since the I-channel or Q-channel extra phase mapping signals produce the prior impulse responses, the power consumption of the modulator is increased.

SUMMARY OF THE INVENTION

An object of the present invention is to provide a digital modulator which is capable of reducing the startup time for data transmission.

Another object of the present invention is to provide a digital modulator which is capable of reducing the power consumption for data transmission.

Still another object of the present invention is to provide a Root-Nyquist raised cosine filter which produces transmission data quickly after the power is turned on.

According to the present invention, in a pulse shaping filter which generates and accumulates a predetermined number of impulse responses including prior impulse responses and posterior impulse responses, the accumulation values of prior impulse responses required for initial data transmission are previously calculated and stored. When

2 several initial impulse responses are to be transmitted, for example, on power-up, the impulse responses corresponding to input digital data are generated and added to the accumulation values of prior impulse responses. The prior impulse responses required for initial data transmission are determined according to the signal point of the initial impulse response so as to provide the predetermined number of impulse responses to be transmitted.

According to an aspect of the present invention, after a first converter has converted a stream of input digital data into mapping signals each indicating a signal point on an orthogonal coordinate according to a PSK modulation scheme having a first predetermined number of signal points on the orthogonal coordinate, a second converter converts the mapping signals into impulse responses corresponding to the mapping signals, respectively, in symbol timings, each impulse response having a time period of a second predetermined number of symbol timings. An example of the PSK modulation is a π/4-shift PSK modulation which is typically used in mobile communication terminals. An accumulator accumulates the second predetermined number of impulse responses in symbol timings to produce digital modulation data, wherein the second predetermined number of impulse responses consists of prior impulse responses and posterior impulse responses. A dummy data memory previously stores an accumulation value of each combination of dummy prior impulse responses in a predetermined transition course prior to a target impulse response corresponding to each of the first predetermined number of signal points on the orthogonal coordinate. When lacking a first number of prior impulse responses, for instance, at power-up, a second number of impulse responses obtained by the second converting means are accumulated and added to the accumulation value stored in the memory to produce the digital modulation data wherein the first number plus the second number equals the second predetermined number with incrementing the second number in symbol timings. It is possible to accumulate the second number of impulse responses obtained by the second converter before adding the accumulation value stored in the memory to the accumulated impulse response value. Such an initial transmission sequence using accumulation values stored in the memory is repeatedly performed until the second number reaches the second predetermined number.

According to another aspect of the present invention, the digital modulator includes a mapper and a mapping signal memory. The mapper maps differential encoded signals on an orthogonal coordinate according to a π/4-shift PSK modulation scheme to produce mapping signals each indicating a signal point on the orthogonal coordinate. The mapping signal memory sequentially stores a predetermined number of mapping signals obtained by the mapping means so as to permit convolution in symbol timings. The digital modulator further includes a pulse shaping filter which pulse-shapes the mapping signals by convolution using the predetermined number of impulse responses each having a time period of the predetermined number of symbol timings.

The pulse shaping filter is comprised of an impulse response converter which converts the predetermined number of mapping signals into impulse responses corresponding to the mapping signals in symbol timings, respectively, and an accumulator which accumulates the predetermined number of impulse responses in symbol timings to produce digital modulation data, the predetermined number of impulse responses consisting of prior impulse responses and posterior impulse responses. The pulse shaping filter is further comprised of a dummy data memory which previously stores an accumulation value of each combination of dummy prior impulse responses in a predetermined transition course prior to a target impulse response corresponding to each of signal points of the π/4-shift PSK modulation on the orthogonal coordinate. The filtering operations of the pulse shaping filter is performed as described before.

According to the present invention, since the accumulation values of prior impulse responses required for initial data transmission are previously stored and used to produce transmitted data, there is no need of generating prior impulse responses based on extra mapping signals, resulting in the reduced startup time and reduced power consumption for data transmission.

DETAILED DESCRIPTION OF THE PREFERRED EMBODIMENTS

Figure 2:
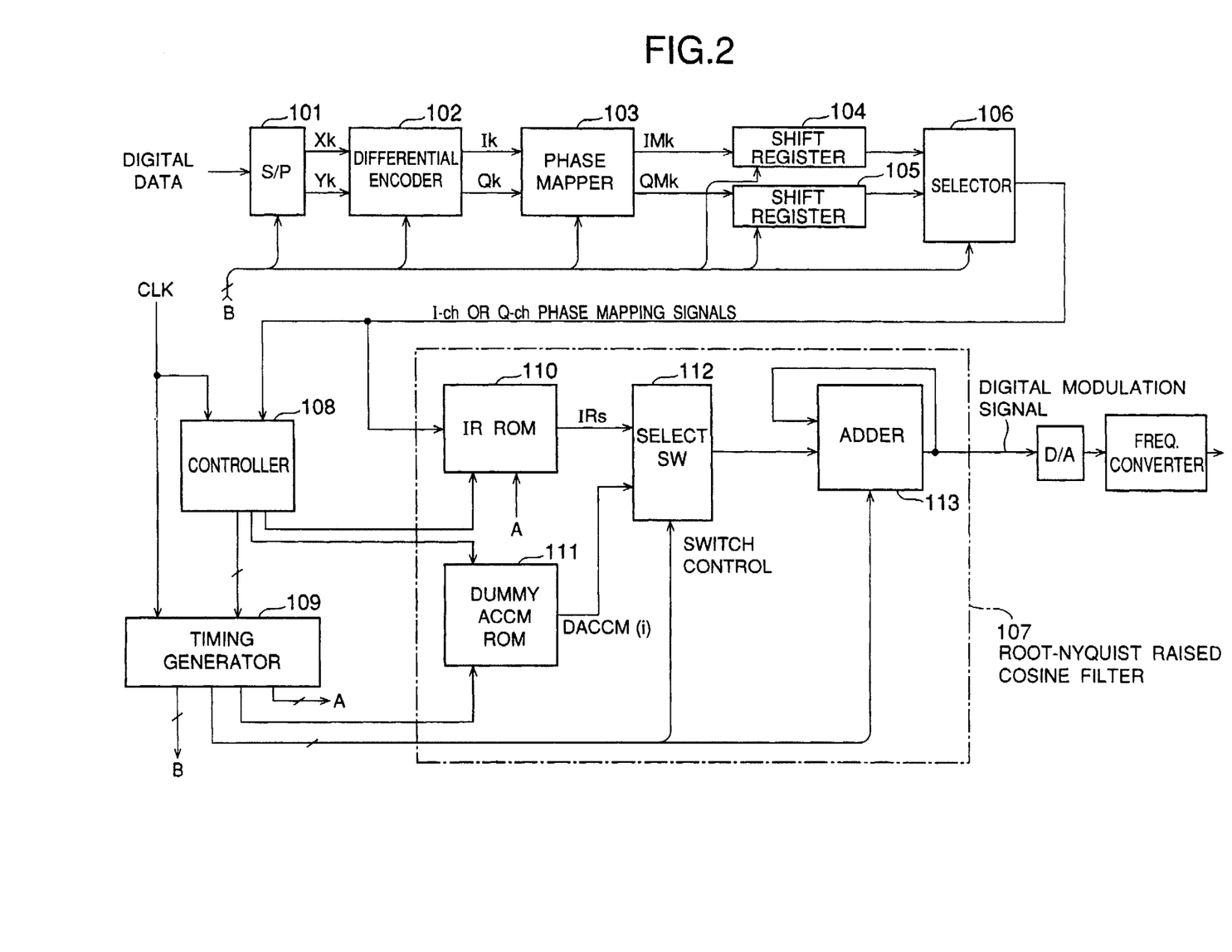
FIG. 2 is a block diagram showing a π/4-shift QPSK modulator according to an embodiment of the present invention.

Referring to FIG. 2, a π/4-shift QPSK modulator inputs digital data to be transmitted and a clock signal synchronized with the digital data and produces digital modulation signals which are then converted by a digital-to-analog converter into intermediate-frequency modulation signals. The π/4-shift QPSK modulator is comprised of a phase mapping circuit, a pulse shaping circuit, and a control circuit.

Phase Mapping

The phase mapping circuit includes a serial-to-parallel converter 101, a differential encoder 102, a phase mapper 103, I-channel shift register 104, Q-channel shift register 105, and a selector 106.

Figure 3:
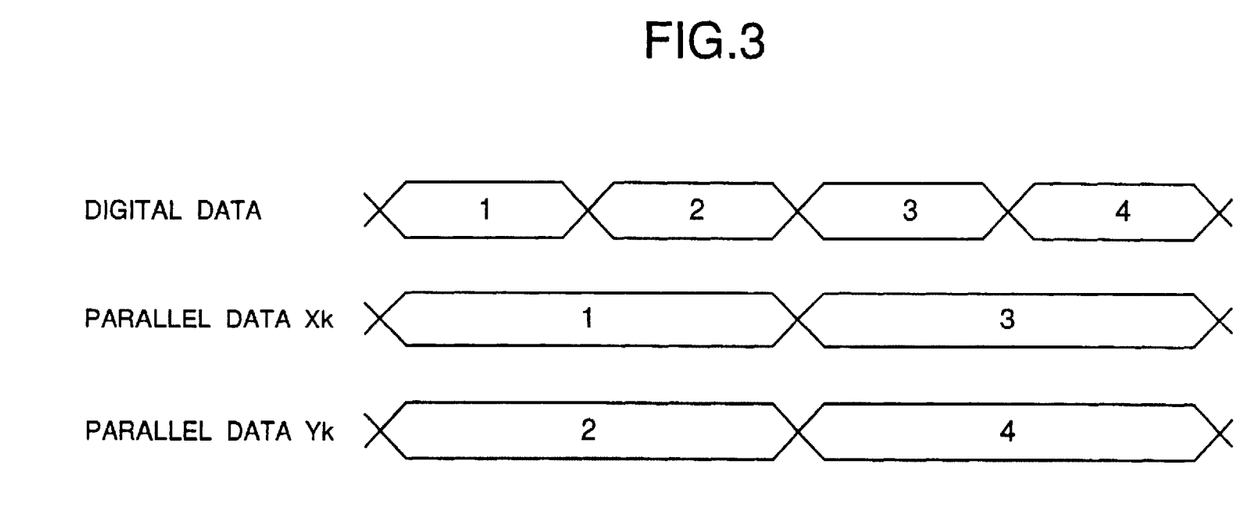
FIG. 3 is a time chart showing parallel data conversion in the modulator of FIG. 2.
Figure 4:
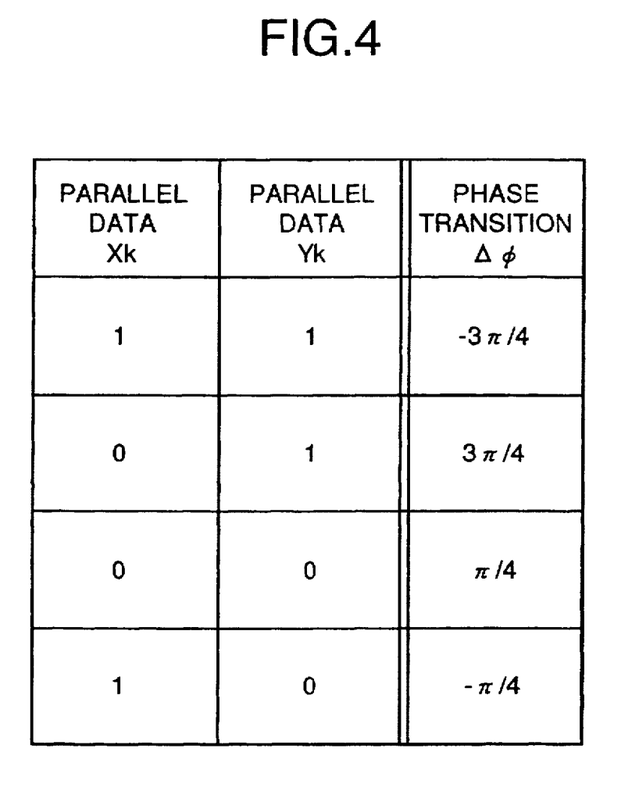
FIG. 4 is a diagram showing a mapping table of parallel data in the modulator of FIG. 2.

As known well, the serial-to-parallel converter 101 converts the digital data into parallel data $X_K$; and $Y_K$ as shown in FIG. 3, and the differential encoder 102 encodes the parallel data $X_K$ and $Y_K$ into encoded data $I_K$ and $Q_K$, respectively, which are represented by the following equations:

$$I_K = I_{K-1} \cos |\Delta\phi(X_K, Y_K)| - Q_{K-1} \sin |\Delta\phi(X_K, Y_K)| \quad (1)$$

and $$Q_K = I_{K-1} \sin |\Delta\phi(X_K, Y_K)| + Q_{K-1} \cos |\Delta\phi(X_K, Y_K)| \quad (2),$$

where the $\Delta\phi(X_K, Y_K)$ is a phase transition determined according to the parallel data $X_K$ and $Y_K$ as shown in FIG. 4.

Figure 5:
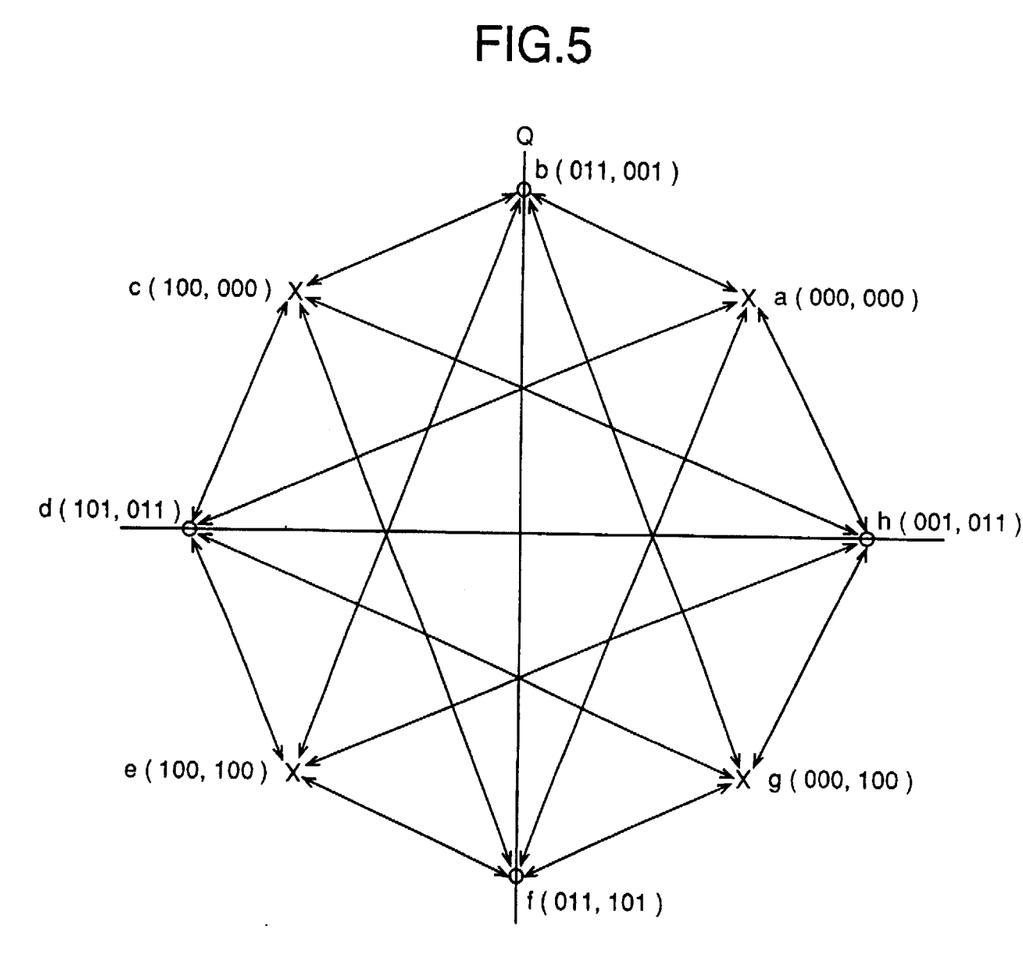
FIG. 5 is a diagram showing transmission signal point assignment of π/4-shift QPSK modulation in the modulator of FIG. 2.
Figure 6:
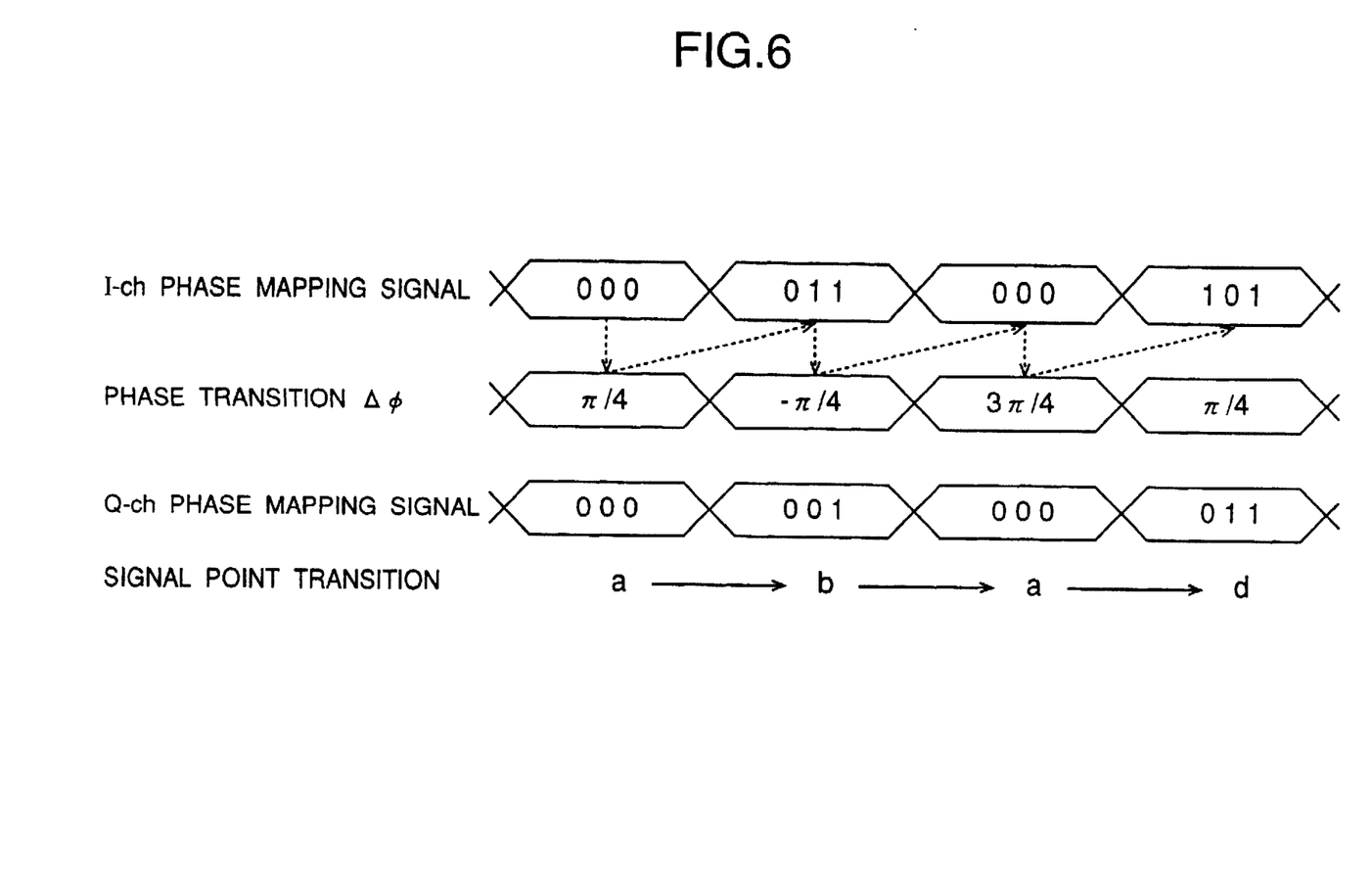
FIG. 6 is a time chart showing several transitions of phase mapping signals in the modulator of FIG. 2.

The phase mapper 103 maps the encoded data $I_K$ and $Q_K$ on the I-Q orthogonal coordinate as shown in FIG. 5 such that the phase mapping position of the encoded data $I_K$ and $Q_K$ is determined based on that of the one-pulse previous encoded data $I_{K-1}$ and $Q_{K-1}$. Assuming that the one-pulse prior signal position is a signal point (a) represented by 3-bit code (000, 000), when receiving the encoded data $I_K$ and $Q_K$ of a phase transition $\Delta\phi(X_K, Y_K) = \pi/4$, the phase mapper 103 maps the encoded data $I_K$ and $Q_K$ at the phase mapping position of a signal point (b) represented by (011, 001). In this manner, the signal points shown by the round marks 'O' and the cross marks 'X' are selected alternately each symbol timings to sequentially produce an I-channel phase mapping signal $IM_K$ and a Q-channel phasemapping signal $QM_K$ which indicate the phasemapping positions of the I channel and the Q channel, respectively. An example of signal point transitions is shown in FIG. 6.

The respective phase mapping signals $IM_K$ and $QM_K$ are sequentially stored in the shift registers 104 and 105 having a predetermined number of steps (8 steps in this embodiment) and the selector 106 selects one of the I-channel and the Q-channel under the control of the control circuit. A plurality of phase mapping signals stored in the shift register of the selected channel are transferred to the Root-cosine filter 107 each time a new phase mapping signal is stored into the shift registers 104 and 105. Such a data transfer sequence permits convolution in the Root-cosine filter 107 as described later. Receiving the phase mapping signals from one of the shift registers 104 and 105, the Root-cosine filter 107 performs pulse shaping in a look-up memory scheme.

Root-Nyquist Filtering

The pulse shaping circuit is comprised of a Root cosine filter 107 including an impulse-response read-only memory (IRROM) 110, a dummy accumulation data ROM (dummy ACCM ROM) 111, a select switch 112, and an adder 113 which are designed to perform convolution. The select switch 112 selects one from output data of the IR ROM 110 and the dummy ACCM ROM 111 to output the selected data to the adder 113 for accumulation.

Impulse-Response ROM

Figure 7:
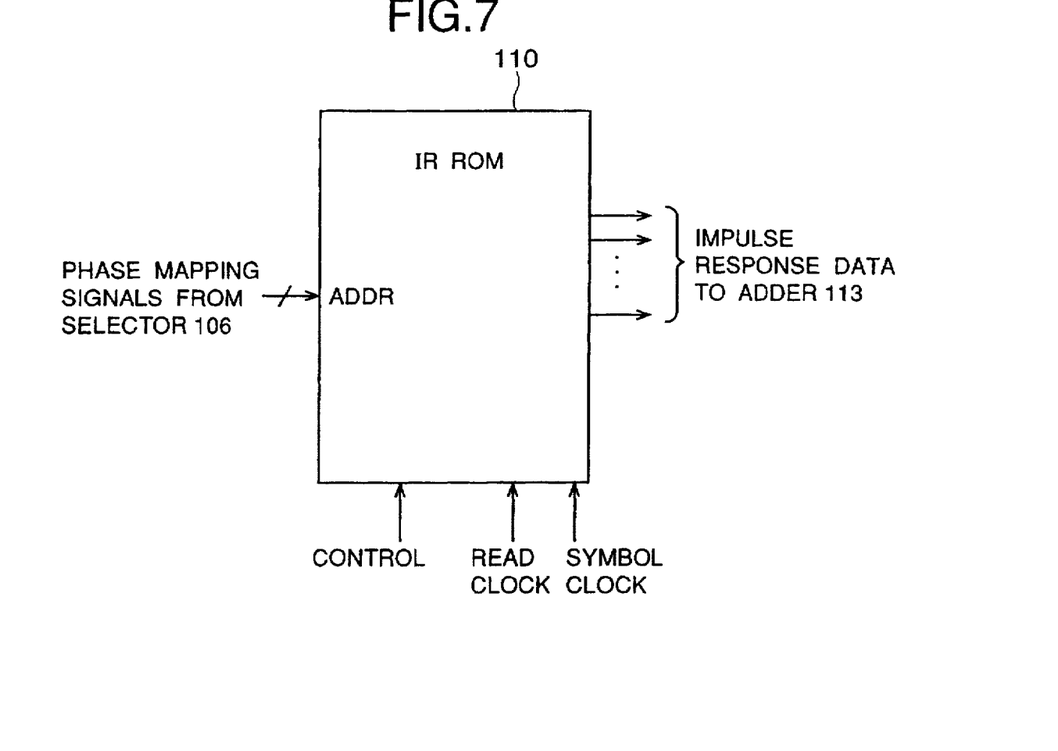
FIG. 7 is a diagram showing an IR ROM of the modulator of FIG. 2.

Referring to FIG. 7, when sequentially receiving phase mapping signals as addresses from a selected one of the shift registers 104 and 105, the IR ROM 110 produces impulse responses IRs corresponding to the phase mapping signals, respectively, and sequentially outputs the impulse responses to the select switch 112 in symbol timings.

Figure 8:
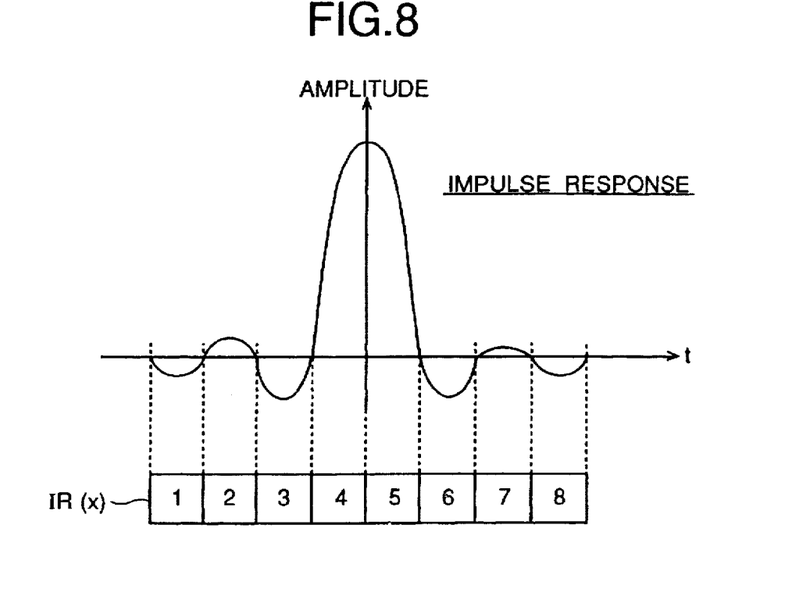
FIG. 8 is a waveform diagram showing an impulse response of the Root-Nyquist raised cosine filter.

As illustrated in FIG. 8, an impulse response spreads over a time period of a predetermined number of symbols (here, 8 symbols). Hereinafter, the timings of 8 symbols of an impulse response IR(x) will be indicated by the numerals of a series of boxes of FIG. 8, respectively, where IR(x)

denotes an impulse response corresponding to a signal point x (one of the signal points a–h) on the I-Q coordinate with its peak amplitude having one of 1 and $2^{1/2}$.

Dummy Accumulation Data ROM

Figure 9:
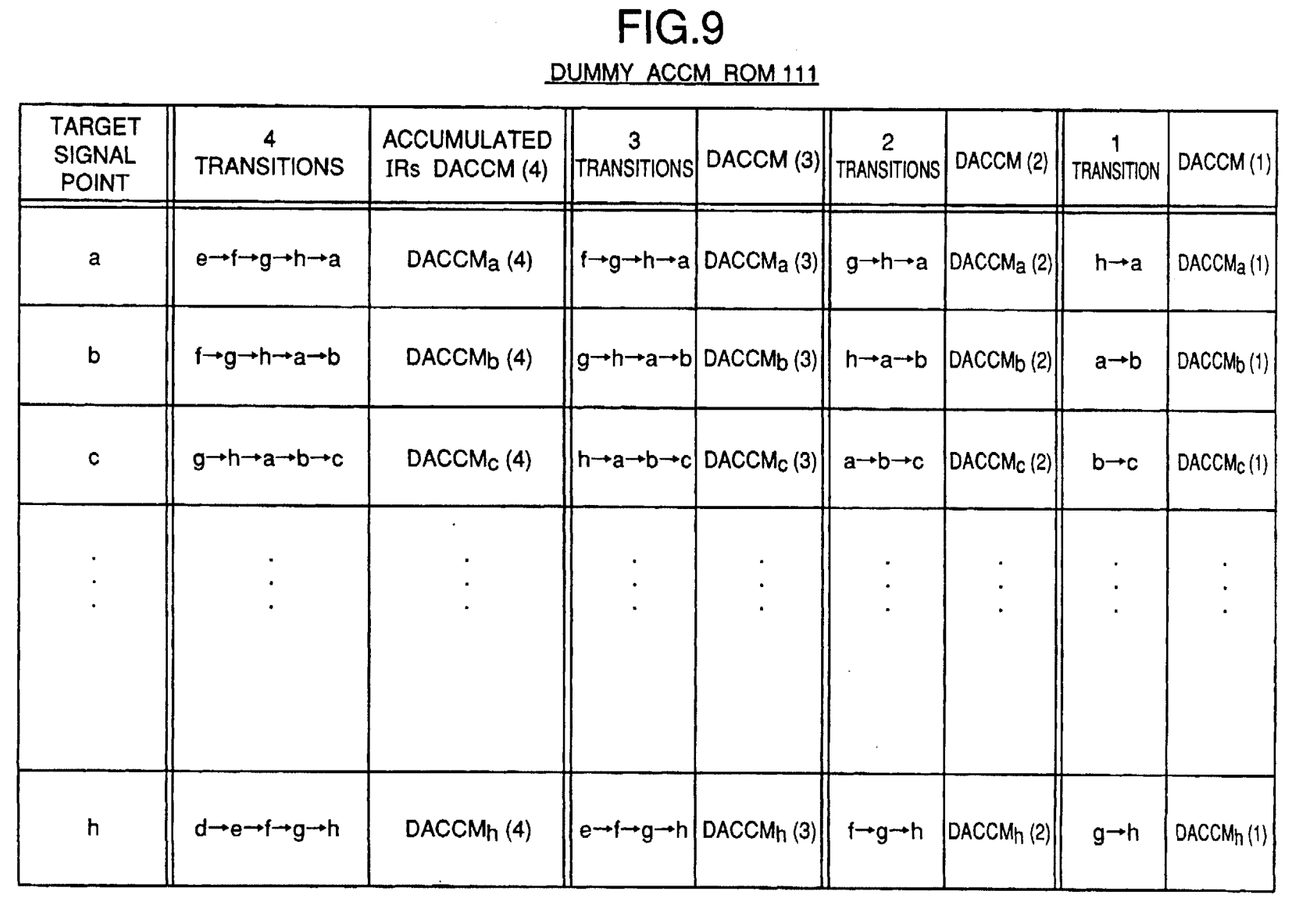
FIG. 9 is a schematic diagram showing the contents of a dummy ACCM ROM of the modulator of FIG. 2.

Referring to FIG. 9, the dummy ACCM ROM 111 previously stores the accumulated IRs data DACCM(n) (n=1, 2, 3, or 4) of the I channel and the Q channel. The accumulated IRS data DACCM(n) is calculated based on a predetermined n-transition course for each target signal point. A target signal point is a signal point which is initially mapped by the digital data to be transmitted. The n-transition course is predetermined according to the signal point assignment as shown in FIG. 5. For example, the 4-transition course reaching the target signal point (a) is determined such that 4 transitions are successively made in order of the signal points (e), (f), (g), (h), and (a). The 3-transition course reaching the target signal point (a) is determined such that 3 transitions are successively made in order of the signal points (f), (g), (h), and (a). Similarly, the 4-transition course reaching the target signal point (b) is determined such that 4 transitions are successively made in order of the signal points (f), (g), (h), (a) and (b). The accumulated IRs data DACCM(n) is calculated by the following procedure.

Figure 10:
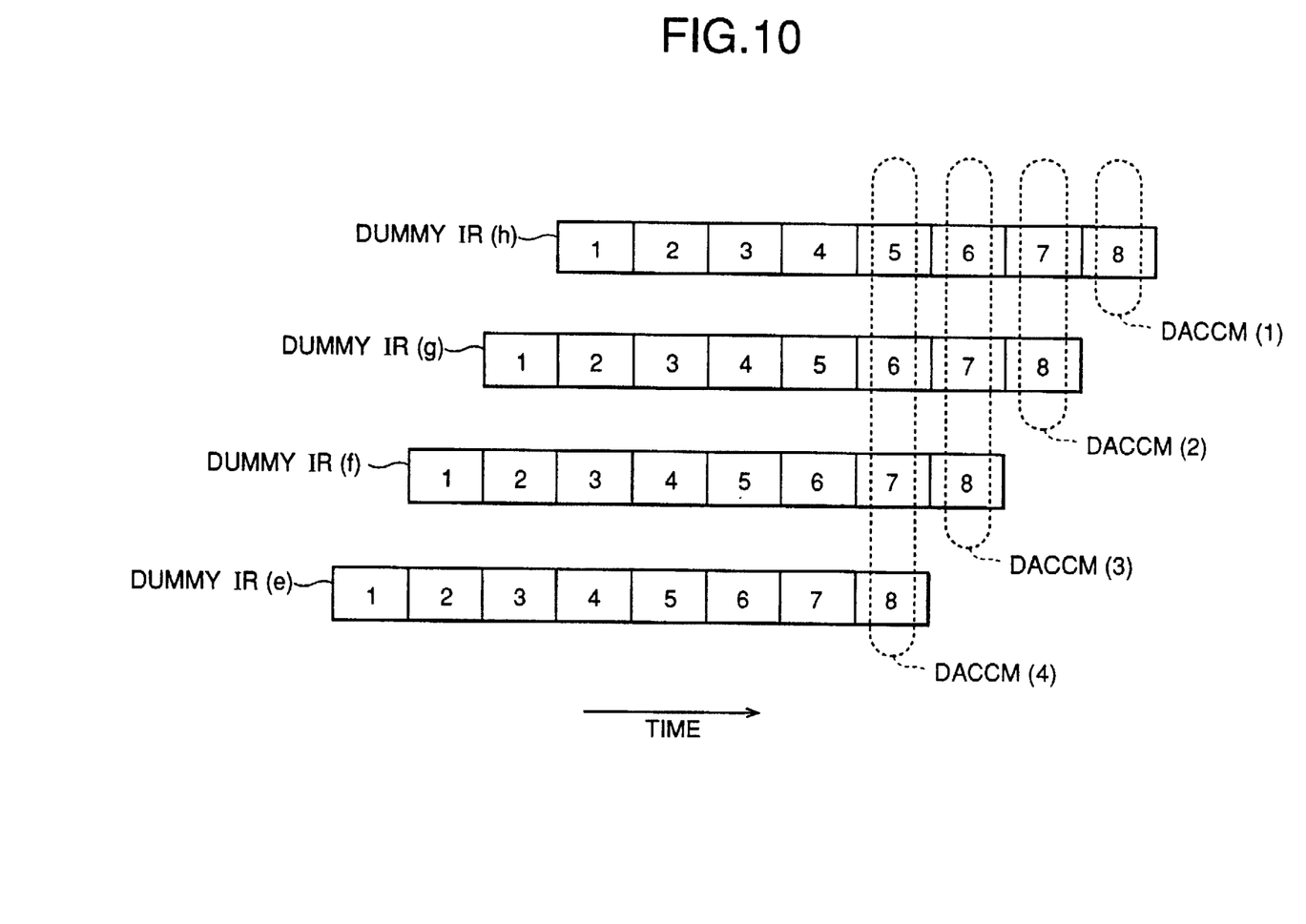
FIG. 10 is a schematic diagram showing an example of accumulated impulse response data.

As shown in FIG. 10, it is assumed that a target signal point is the signal point (a) and 4 impulse responses IR(e) –IR(h) are generated. The 4-transition dummy accumulation data $DACCM_a(4)$ is obtained by accumulating first dummy data of the $8^{th}$ symbol timing in the first impulse response IR(e) corresponding to the signal point (e), second dummy data of the $7^{th}$ symbol timing in the second impulse response IR(f) corresponding to the signal point (f), third dummy data of the $6^{th}$ symbol timing in the third impulse response IR(g) corresponding to the signal point (g), and fourth dummy data of the $5^{th}$ symbol timing in the fourth impulse response IR(h) corresponding to the signal point (h). The 3-transition dummy accumulation data $DACCM_a(3)$ is obtained by accumulating first dummy data of the $8^{th}$ symbol timing in the second impulse response IR(f), second dummy data of the $7^{th}$ symbol timing in the third impulse response IR(g) and third dummy data of the $6^{th}$ symbol timing in the fourth impulse response IR(h). Similarly, the 2-transition dummy accumulation data $DACCM_a(2)$ is obtained by accumulating first dummy data of the $8^{th}$ symbol timing in the third impulse response IR(g) and second dummy data of the $7^{th}$ symbol timing in the fourth impulse response IR(h), and finally the 1-transition dummy accumulation data $DACCM_a(1)$ is dummy data of the $8^{th}$ symbol timing in the fourth impulse response IR(h).

Using the similar calculation procedure, other dummy accumulation data $DACCM_b(n)$–$DACCM_h(n)$ are also obtained and stored in the dummy ACCM ROM 111 as shown in FIG. 9.

The IR ROM 110 and the dummy ACCM ROM 111 are controlled by the control circuit including a controller 108 and a timing generator 109. The timing generator 109 generates necessary timing clock signals based on the clock signal synchronized with the digital data under the control of the controller 108. Each timing clock signal is supply to a corresponding circuit of the modulator. In the Root-Nyquist filter 107, the select switch 112 receives a switch control signal from the timing generator 109 to select either the impulse responses IRs or the dummy accumulation data DACCM.

Filtering Operation

When turning the power on and receiving the digital data to be transmitted, as described before, the I-channel phase mapping signal $IM_K$ and the Q-channel phase mapping signal $QM_K$ are sequentially stored into the shift registers 104 and 105, respectively. The selector 106 selects the I-channel phase mapping signals and the Q-channel phase mapping signals alternately. The stored phase mapping signals in the selected shift register are sequentially transferred to the IR ROM 110 of the Root-Nyquist filter 107 each time new phase mapping signals are stored into the shift registers 104 and 105. The filtering operation of the Root-Nyquist filter 107 will be described hereinafter, assuming that signal point transitions in the I channel are made as shown in FIG. 6 after the power has been turned on.

Figure 11:
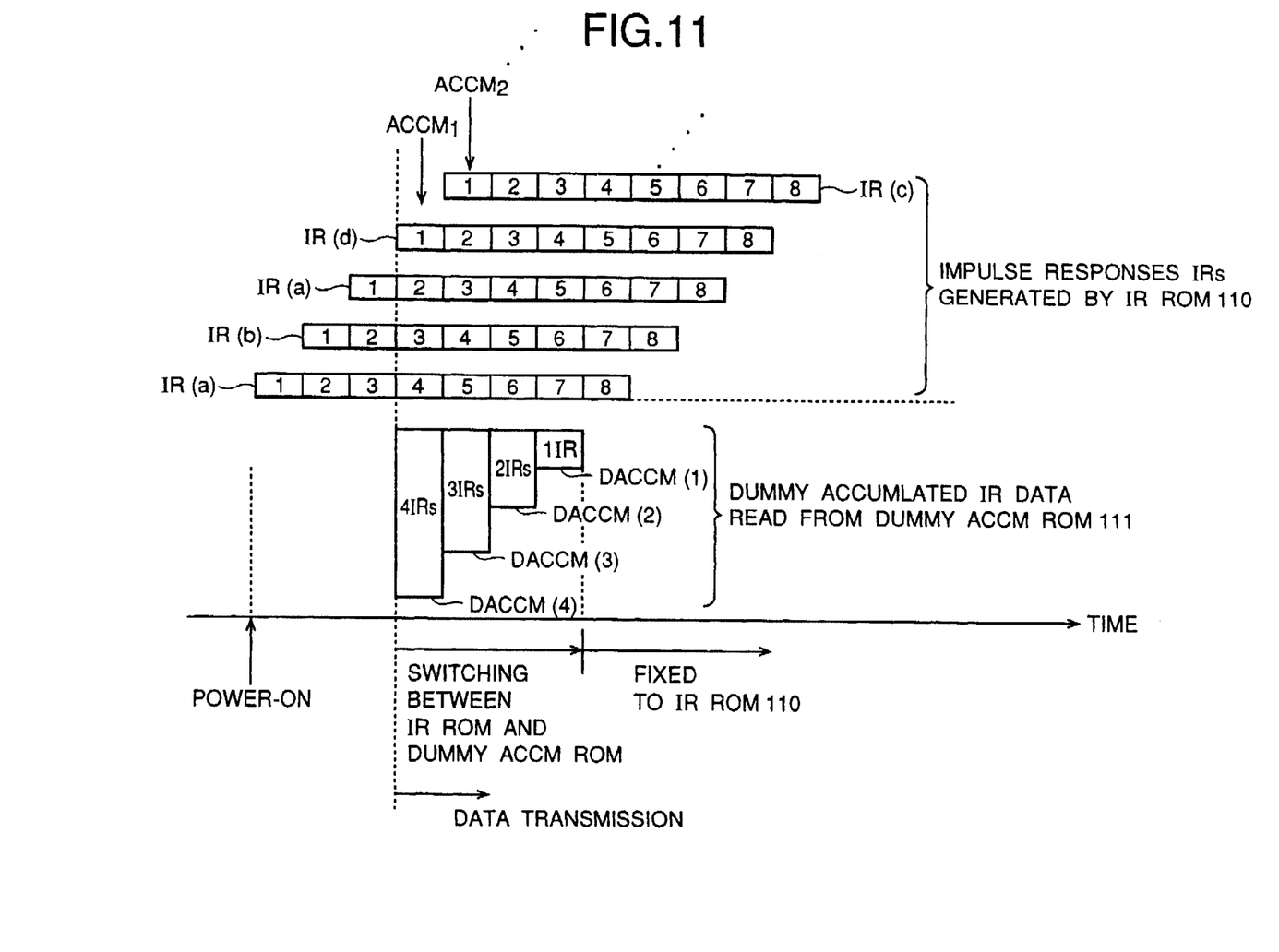
FIG. 11 is a time chart showing a Root-Nyquist raised-cosine filtering operation on power-up in the modulator of FIG. 2.
Figure 12A:
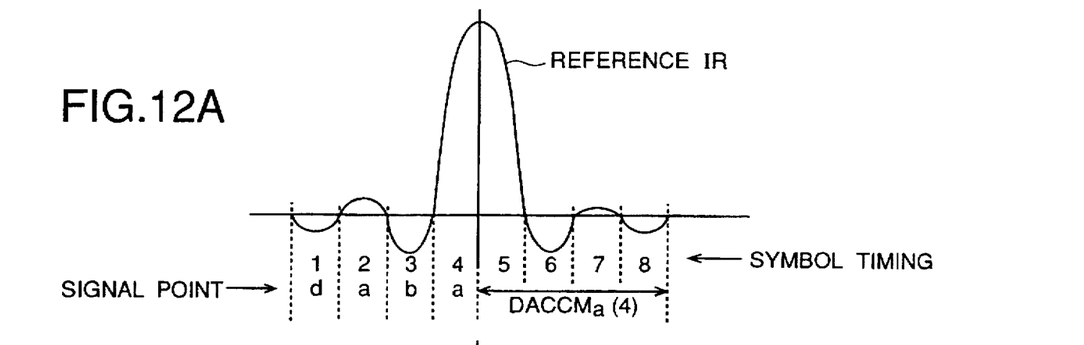
FIGS. 12A–12D are schematic diagrams showing a sequence of the Root-Nyquist raised-cosine filtering operation on power-up in the modulator of FIG. 2.
Figure 12B:
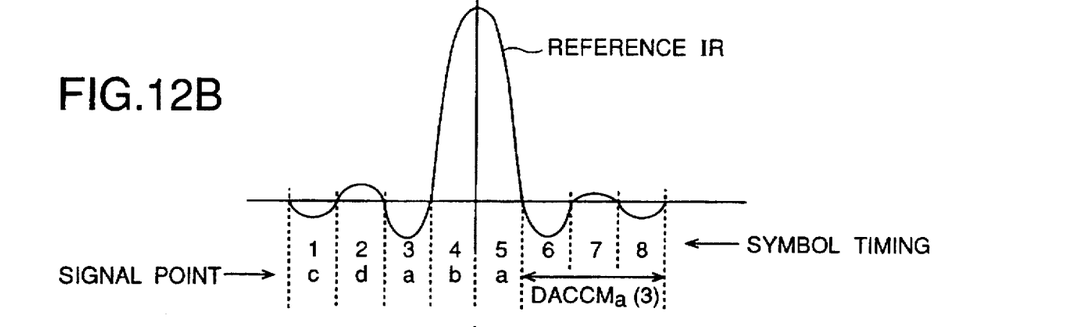
Figure 12C:
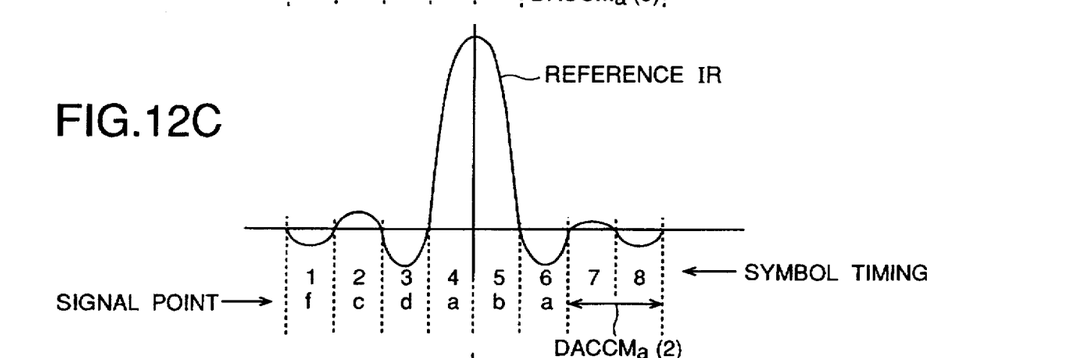
Figure 12D:
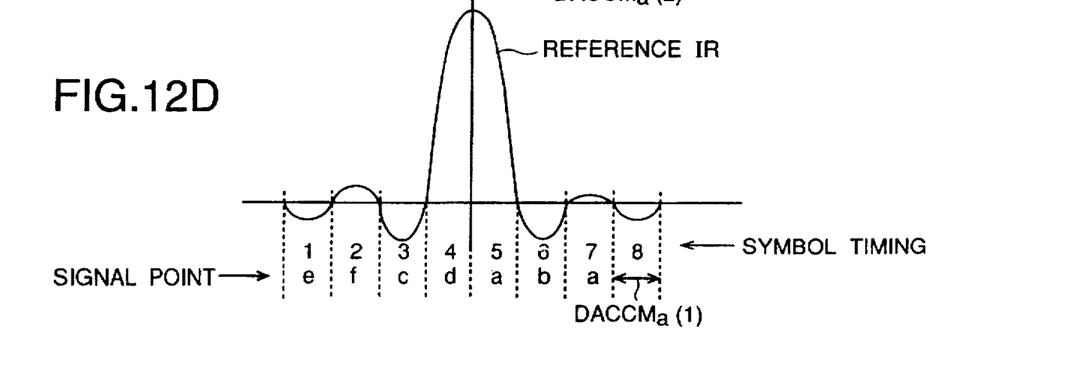

Referring to FIG. 11, when 4 phase mapping signals are stored in the shift register 104, the selector 106 selects the shift register 104, so that the four phase mapping signals are transferred one by one to the controller 108 and the IR ROM 110. Receiving the phase mapping signals sequentially, the IR ROM 110 generates in symbol timings four impulse responses IR(a), IR(b), IR(a), and IR(d) corresponding to the phase mapping signals of signal points (a), (b), (a), and (d), respectively. The controller 108 determines which dummy accumulation data DACCM be read from the dummy ACCM ROM 111 according to the target phase mapping signal which, in this case, corresponds to the signal point (a).

Since the select switch 112 connects the IR ROM 110 to the adder 113, the impulse responses IR(a), IR(b), IR(a), and IR(d) are sequentially transferred to the adder 113, which accumulates the impulse responses IR(a), IR(b), IR(a) and IR(d) at the $4^{th}$ symbol timing of the first impulse response IR(a). In the same symbol timing after the impulse responses IR(a), IR(b), IR(a) and IR(d) are accumulated by the adder 113, the select switch 112 switches to the dummy ACCM ROM 111 according to the switch control signal. Simultaneously, the controller 108 controls the ACCM ROM 111 such that the dummy accumulation data $DACCM_a(4)$ is read and output to the select switch 112. This causes the dummy accumulation data $DACCM_a(4)$ to be transferred from the dummy ACCM ROM 111 to the adder 113 where the dummy accumulation data $DACCM_a(4)$ is added to the accumulation result of the impulse responses IR(a), IR(b), IR(a) and IR(d). As described before, the dummy accumulation data $DACCM_a(4)$ is obtained by accumulating first dummy data of the $8^{th}$ symbol timing in the first impulse response IR(e), second dummy data of the $7^{th}$ symbol timing in the second impulse response IR(f), third dummy data of the $6^{th}$ symbol timing in the third impulse response IR(g), and fourth dummy data of the $5^{th}$ symbol timing in the fourth impulse response IR(h) as shown in FIG. 10. Therefore, by using the dummy accumulation data $DACCM_a(4)$, the impulse responses corresponding to 8 symbols are accumulated to produce transmitted data $ACCm_1$ which is converted into analog and then frequency-converted into a radio transmission signal.

After the transmitted data $ACCM_1$ has been transmitted, the adder 113 is reset, the select switch 112 switches back to the IR ROM 110, and the selector 106 switches to the shift register 105. Since the shift register 105 also stores four Q-channel phase mapping signals, the Q-channel phase mapping signals are transferred one by one to the controller 108 and the IR ROM 110. And the same Root-Nyquist filtering as in the I-channel is also performed in the Q channel.

When the Q-channel data transmission has been performed based on the four phase mapping signals stored in the shift register 105, the adder 113 is reset, the select switch 112 switches to the IR ROM 110, and the selector 106 switches back to the shift register 104. At the next symbol timing, when one new phase mapping signal is stored into the I-channel shift register 104 so that a total of 5 phase mapping signals including the former 4 phase mapping signals are stored, the 5 phase mapping signals are transferred one by one to the controller 108 and the IR ROM 110 through the selector 106. Receiving the 5 phase mapping signals sequentially, the IR ROM 110 generates in symbol timings the four impulse responses IR(a), IR(b), IR(a) and IR(d) and further an impulse response IR(c) corresponding to the last signal point (c). The controller 108 determines which dummy accumulation data DACCM be read from the dummy ACCM ROM 111 according to the target phase mapping signal (a).

Since the select switch 112 connects the IR ROM 110 to the adder 113, the impulse responses IR(a), IR(b), IR(a), IR(d) and IR(c) are sequentially transferred to the adder 113, which accumulates the impulse responses IR(a), IR(b), IR(a), IR(d) and IR(c) in the $5^{th}$ symbol timing of the first impulse response IR(a). In the same symbol timing after the impulse responses IR(a), IR(b), IR(a), IR(d) and IR(c) are accumulated by the adder 113, the select switch 112 switches to the dummy ACCM ROM 111 by the switch control signal. Simultaneously,the controller 108controls the ACCM ROM 111 such that the dummy accumulation data $DACCM_a(3)$ is read and output to the select switch 112. This causes the dummy accumulation data $DACCM_a(3)$ to be transferred from the dummy ACCM ROM 111 to the adder 113 where the dummy accumulation data $DACCM_a(3)$ is added to the accumulation result of the impulse responses IR(a), IR(b), IR(a), IR(d) and IR(c). As described before, the dummy accumulation data $DACCM_a(3)$ is obtained by accumulating first dummy data of the $8^{th}$ symbol timing in the second impulse response IR(f), second dummy data of the $7^{th}$ symbol timing in the third impulse response IR(g), and third dummy data of the $6^{th}$ symbol timing in the fourth impulse response IR(h) as shown in FIG. 10. Therefore, by using the dummy accumulation data $DACCM_a(3)$, the impulse responses corresponding to 8 symbols are accumulated to produce transmitted data $ACCM_2$ which is converted into analog and then frequency-converted into a radio transmission signal.

Similarly, at the more subsequent symbol timing, the dummy accumulation data $DACCM_a(2)$ is added to the accumulation result of 6 impulse responses including the former 5 impulse responses IR(a), IR(b), IR(a), IR(d) and IR(c) so that the impulse responses corresponding to 8 symbols are accumulated to produce transmitted data. At the still more subsequent symbol timing, the dummy accumulation data $DACCM_a(1)$ is added to the accumulation result of 7 impulse responses including the former 6 impulse responses so that the impulse responses corresponding to 8 symbols are accumulated to produce transmitted data.

Finally, at the $8^{th}$ symbol timing of the first impulse response IR(a), 8 phase mapping signals including the former 7 phase mapping signals are store into the shift register 104. Therefore, the 8 phase mapping signals are sequentially transferred to the IRROM 110 which generates the impulse responses corresponding to 8 symbols based on the digital data only. From this symbol timing up, the select switch 112 is fixed to the IR ROM 110 which generates the impulse responses corresponding to 8 symbols without the help of the dummy ACCM ROM 111.

Referring to FIGS. 12A–12D, the dummy accumulation data $DACCM_a(4)$ to $DACCM_a(1)$ are added to the accumulation results of impulse responses corresponding to mapping signals to produce transmitted data $ACCM_1$ to $ACCM_4$ at the $4^{th}$ to $7^{th}$ symbol timings of the first impulse response IR(a), respectively. It should be noted that reference impulse responses as shown in these FIGS. do not represent the real wave forms of impulse responses but just indicate the symbol timings.

In the embodiment described above, the dummy accumulation data $DACCM_a(4)$ is read from the dummy ACCM ROM 111 at the $4^{th}$ symbol timing of the first impulse response IR(a). It is also possible to read the dummy accumulation data $DACCM_a(4)$ at the $1^{st}$ symbol timing of the first impulse response IR(a) and transfer it to the adder 113.

What is claimed is:

1. A digital modulator comprising:
   first converting means for converting a stream of input digital data into mapping signals each indicating a signal point on an orthogonal coordinate according to a PSK (phase shift keying) modulation scheme having a first predetermined number of signal points on the orthogonal coordinate;

second converting means for converting the mapping signals into impulse responses corresponding to the mapping signals, respectively, in symbol timings, each impulse response having a time period of a second predetermined number of symbol timings;

accumulation means for accumulating the second predetermined number of impulse responses in symbol timings to produce digital modulation data, the second predetermined number of impulse responses consisting of prior impulse responses and posterior impulse responses;

storage means for previously storing an accumulation value of each combination of dummy prior impulse responses in a predetermined transition course prior to a target impulse response corresponding to each of the first predetermined number of signal points on the orthogonal coordinate; and control means for controlling the accumulation means, the second converting means and the storage means such that, when lacking a first number of prior impulse responses, a second number of impulse responses obtained by the second converting means are accumulated and added to the accumulation value of the first number of dummy prior impulse responses stored in the storage means to produce the digital modulation data wherein the first number plus the second number equals the second predetermined number with incrementing the second number up to the second predetermined number in symbol timings.

2. The digital modulator according to claim 1, wherein the control means comprises:
   a select switch for electrically connecting the accumulation means to one of the second converting means and the storage means; and
   a controller for controlling the select switch such that the second number of impulse responses obtained by the second converting means are transferred in symbol timings to the accumulation means and then the accumulation value of the first number of dummy prior impulse responses is transferred from the storage means to the accumulation means to produce the digital modulation data until the second number reaches the second predetermined number.

3. The digital modulator according to claim 1, wherein the second converting means and the accumulation means form a root-Nyquist raised cosine filter.

4. The digital modulator according to claim 1, wherein the first converting means comprises:

encoding means for encoding the input digital data into I-channel data and Q-channel data;

mapping means for mapping the I-channel data and the Q-channel data on an orthogonal coordinate to produce an I-channel mapping signal and a Q-channel mapping signal, respectively;

first storing means for storing the I-channel mapping signal, the first storing means having a capacity of the second predetermined number of mapping signals;

second storing means for storing the Q-channel mapping signal, the second storing means having a capacity of the second predetermined number of mapping signals; and selecting means for selecting one of the I-channel mapping signal and the Q-channel mapping signal received from the first storing means and the second storing means, respectively, to output a selected mapping signal to the second converting means.

5. The digital modulator according to claim 4, wherein the control means controls the first storing means, the second storing means, and the selecting means such that, when the second number of selected mapping signals are stored in a selected one of the first storing means and the second storing means, the second number of selected mapping signals are transferred to the second converting means.

6. The digital modulator according to claim 1, wherein the second number is not smaller than a half the second predetermined number.

7. The digital modulator according to claim 5, wherein the second number is not smaller than a half the second predetermined number.

8. A digital modulator comprising:

mapping means for mapping differential encoded signals on an orthogonal coordinate according to a π/4-shift PSK modulation scheme to produce mapping signals each indicating a signal point on the orthogonal coordinate;

storing means for sequentially storing a predetermined number of mapping signals obtained by the mapping means so as to permit convolution in symbol timings; and filtering means for pulse-shaping the mapping signals by convolution using the predetermined number of impulse responses each having a time period of the predetermined number of symbol timings, the filtering means comprising:

converting means for converting the predetermined number of mapping signals into impulse responses corresponding to the mapping signals in symbol timings, respectively;

accumulation means for accumulating the predetermined number of impulse responses in symbol timings to produce digital modulation data, the predetermined number of impulse responses consisting of prior impulse responses and posterior impulse responses;

dummy data storing means for previously storing an accumulation value of each combination of dummy prior impulse responses in a predetermined transition course prior to a target impulse response corresponding to each of signal points of the π/4-shift PSK modulation on the orthogonal coordinate; and control means for controlling an operation for the convolution such that, when lacking a first number of prior impulse responses, a second number of impulse responses obtained by the converting means are accumulated and added to the accumulation value of the first number of dummy prior impulse responses stored in the dummy data storing means to produce the digital modulation data wherein the first number plus the second number equals the predetermined number with incrementing the second number up to the second predetermined number in symbol timings.

9. The digital modulator According to claim 8, wherein the control means comprises:

a select switch for electrically connecting the accumulation means to one of the converting means and the dummy data storing means; and a controller for controlling the select switch such that the second number of impulse responses obtained by the converting means are transferred in symbol timings to the accumulation means and then the accumulation value of the first number of dummy prior impulse responses is transferred from the dummy data storing means to the accumulation means to produce the digital modulation data until the second number reaches the predetermined number.

10. The digital modulator according to claim 9, wherein the filtering means comprises a root-Nyquist raised cosine filter.

11. The digital modulator according to claim 9, wherein the mapping means comprises:

a differential encoder for encoding input digital data into the differential encoded signals in I-channel and Q-channel; and a mapper for mapping the differential encoded signals on an orthogonal coordinate to produce an I-channel mapping signal and a Q-channel mapping signal, respectively; and the storing means comprises:

a first shift register for sequentially storing the I-channel mapping signal, the first storing means having a capacity of the predetermined number of mapping signals; and a second shift register for sequentially storing the Q-channel mapping signal, the second storing means having a capacity of the predetermined number of mapping signals, and the digital modulator further comprising:

a selector for selecting one of the I-channel mapping signal and the Q-channel mapping signal received from the first shift register and the second shift register, respectively, to output a selected mapping signal to the converting means.

12. The digital modulator according to claim 11, wherein the control means controls the first shift register, the second shift register, and the selector such that, when the second number of selected mapping signals are stored in a selected one of the first shift register and the second shift register, the second number of selected mapping signals are transferred to the converting means.

13. The digital modulator according to claim 8, wherein the second number is not smaller than a half the predetermined number.

14. A method for modulating input digital data into digital modulation data in a digital modulator having a root-Nyquist filter performing a root-Nyquist raised cosine filtering by accumulating a first predetermined number of impulse responses in symbol timings, the second predetermined number of impulse responses consisting of prior impulse responses and posterior impulse responses, the method comprising the steps of:

converting a stream of the input digital data into mapping signals each indicating a signal point on an orthogonal coordinate according to a PSK (phase shift keying) modulation scheme having a second predetermined number of signal points on the orthogonal coordinate;

preparing an accumulation value of each combination of dummy prior impulse responses in a predetermined transition course prior to a target impulse response corresponding to each of the second predetermined number of signal points on the orthogonal coordinate, each dummy impulse response having a time period of the first predetermined number of symbol timings;

converting the mapping signals into first impulse responses corresponding to the mapping signals, respectively, in symbol timings, each first impulse response having the time period of the first predetermined number of symbol timings; and adding a first number of first impulse responses and the accumulation value of a second number of dummy prior impulse responses to produce the digital modulation data when lacking the second number of prior impulse responses, wherein the first number plus the second number equals the second predetermined number with incrementing the first number up to the first predetermined number in symbol timings.

15. A method for modulating input digital data into digital modulation data in a digital modulator having a root-Nyquist filter performing a root-Nyquist raised cosine filtering by accumulating a first predetermined number of impulse responses in symbol timings, the second predetermined number of impulse responses consisting of prior impulse responses and posterior impulse responses, the method comprising the steps of:

encoding a stream of the input digital data into differential encoded signals;

mapping the differential encoded signals on an orthogonal coordinate according to a π/4-shift PSK modulation scheme to produce mapping signals each indicating a signal point on the orthogonal coordinate;

sequentially storing a predetermined number of mapping signals so as to permit convolution in symbol timings; and filtering the predetermined number of mapping signals to produce the digital modulation data, the filtering step comprising:

preparing an accumulation value of each combination of dummy prior impulse responses in a predetermined transition course prior to a target impulse response corresponding to each of signal points of the π/4-shift PSK modulation on the orthogonal coordinate, each dummy prior impulse response having a time period of the predetermined number of symbol timings;

converting the predetermined number of the mapping signals into first impulse responses corresponding to the mapping signals in symbol timings, respectively, each impulse response having the time period of the predetermined number of symbol timings;

adding a first number of first impulse responses and the accumulation value of a second number of dummy prior impulse responses to produce the digital modulation data when lacking the second number of prior impulse responses, wherein the first number plus the second number equals the second predetermined number with incrementing the first number up to the first predetermined number in symbol timings.

16. A pulse shaping filter for a digital modulator, comprising:

converting means for converting mapping signals of PSK modulation into impulse responses corresponding to the mapping signals, respectively, in symbol timings, the PSK modulation having a first predetermined number of signal points, and each impulse response having a time period of a second predetermined number of symbol timings;

accumulation means for accumulating the second predetermined number of impulse responses in symbol timings to produce digital modulation data, the second predetermined number of impulse responses consisting of prior impulse responses and posterior impulse responses;

storage means for previously storing an accumulation value of each combination of dummy prior impulse responses in a predetermined transition course prior to a target impulse response corresponding to each of the first predetermined number of signal points on the orthogonal coordinate; and control means for controlling the accumulation means, the converting means and the storage means such that, when lacking a first number of prior impulse responses, a second number of impulse responses obtained by the converting means are accumulated and added to the accumulation value of the first number of dummy prior impulse responses stored in the storage means to produce the digital modulation data wherein the first number plus the second number equals the second predetermined number with incrementing the second number up to the second predetermined number in symbol timings.

17. The pulse shaping filter according to claim 16, wherein the control means comprises:

a select switch for electrically connecting the accumulation means to one of the converting means and the storage means; and a controller for controlling the select switch such that the second number of impulse responses obtained by the converting means are transferred in symbol timings to the accumulation means and then the accumulation value of the first number of dummy prior impulse responses is transferred from the storage means to the accumulation means to produce the digital modulation data until the second number reaches the second predetermined number.

18. The pulse shaping filter according to 16, wherein the converting means comprises a look-up memory which uses the mapping signals of PSK modulation as addresses, respectively, to produce the impulse responses.

* * * * *